United States Patent [19]
Mamiya et al.

[11] Patent Number: 5,462,039
[45] Date of Patent: Oct. 31, 1995

[54] AIR-FUEL RATIO CONTROL SYSTEM FOR INTERNAL COMBUSTION ENGINE

[75] Inventors: Kiyotaka Mamiya, Higashihiroshima; Michihiro Imada; Takanobu Morimasa, both of Hiroshima, all of Japan

[73] Assignee: Mazda Motor Corporation, Hiroshima, Japan

[21] Appl. No.: 166,027

[22] Filed: Dec. 14, 1993

[30] Foreign Application Priority Data

Dec. 14, 1992 [JP] Japan .................. 4-332978

[51] Int. Cl.⁶ .................................... F02D 41/14
[52] U.S. Cl. .................................... 123/686; 60/284
[58] Field of Search .................... 123/686, 689; 60/284

[56] References Cited

U.S. PATENT DOCUMENTS 5,345,921 9/1994 Iwano et al. ................. 123/686

FOREIGN PATENT DOCUMENTS

2-230935 9/1990 Japan .

*Primary Examiner*—Tony M. Argenbright
*Attorney, Agent, or Firm*—Keck, Mahin & Cate

[57] ABSTRACT

During an air-fuel ratio feedback control based on an oxygen concentration in exhaust gases which converges an air-fuel ratio toward a target ratio suitable for a satisfactory purifying efficiency of a catalyst, the air-fuel ratio is coercively deflected so as to make a fuel mixture richer and leaner alternatively. An extent of deflection of the air-fuel ratio is set larger before the catalyst has not yet been activated sufficiently.

11 Claims, 8 Drawing Sheets

AIR-FUEL RATIO CONTROL SYSTEM FOR INTERNAL COMBUSTION ENGINE

BACKGROUND OF THE INVENTION

1. Field of the Invention

This invention relates to an air-fuel ratio control system for controlling the air-fuel ratio of a fuel mixture for an internal combustion engine.

2. Description of the Related Art

The air-fuel ratio A/F of a fuel mixture delivered into an engine is basically established according to the amount of intake air, which depends upon a throttle valve opening (TVO) of a throttle valve operated by the driver, and the speed of rotation of the engine. This basic air-fuel ratio is also correctly controlled to make a fuel mixture richer or leaner according to engine operating conditions so as to be most suitable for both of actual engine operating conditions and vehicle driving characteristics. Incidentally, in order to meet strict emission regulations, vehicles have been equipped with exhaust gas purifying devices which make the use of three-way catalytic converters. Such a three-way catalytic converter is able to perform both oxidation carbon monoxide (CO) and hydrocarbons (HC) and deoxidation or reduction of nitrogen oxides (NOx) coincidentally only within a considerably narrow range (window) of air-fuel ratio in the vicinity of a theoretically ideal air-fuel ratio (A/F=14.7 or =1), and purify the exhaust gas by changing it into carbon dioxide ($CO_2$), water ($H_2O$), oxygen ($O_2$), and nitrogen ($N_2$), which do not pose a health problem to human body. In other words, the exhaust gas purifying devices with the use of three-way catalytic converters discharge nitrogen dioxides (NOx) if an air-fuel ratio is shifted on a lean side from the theoretically ideal air-fuel ratio of 14.7 or $\lambda=1$, and carbon monoxide (CO) and hydrocarbons (HC), if shifted to a rich side from the theoretically ideal air-fuel ratio of 14.7 or $\lambda=1$.

Accordingly, in order to realize effective activities of the three-way catalytic converter so as to assure adequate and sufficient purification of exhaust gas, it is necessary for the engine to maintain the actual air-fuel ratio of a fuel mixture at the theoretically ideal air-fuel ratio of 14.7 according to operational requirements of the engine with accuracy and reliability as high as possible.

However, because the allowable range (window) of the theoretically ideal air-fuel ratio, which is defined as $\lambda=1\pm a$, is too narrow to purify carbon monoxide (CO) and hydrocarbons (HC) and nitrogen dioxides (NOx) all at once, it is not feasible to meet the rigorous emission regulations as described above through an ordinary open loop control of air-fuel ratio. For this reason, conventionally, an electronic feedback or closed loop control of air fuel ratio has been conducted to control the amount of fuel delivered into the engine according to changes in actual air-fuel ratio as soon as possible so as to develop reliably and maintain the actual air-fuel ratio within the allowable range (window) of the theoretically ideal air-fuel ratio (14.7±φ or $\lambda=1\pm a$) as a target air-fuel ratio. In this electronic air-fuel ratio feedback control, changes in actual air-fuel ratio are equivalently determined based on the concentration of oxygen in the exhaust gas, which is detected as an emission air-fuel ratio by an oxygen ($O_2$) sensor with a high accuracy. The exercise of such an electronic feedback control realizes the sufficiently satisfied purification of exhaust gas.

Three-way catalytic converters, which have their own active temperatures, exhibit adequate purification characteristics only for the temperatures of exhaust gases above a critical level. Consequently, within a certain period of time after starting of an engine, it is general to suspend the feedback of the concentration of oxygen ($O_2$) and then conduct an open loop control so as to enrich a fuel mixture, thereby providing an air-fuel ratio higher than the theoretically ideal air-fuel ratio in order to accelerate warming-up of the engine. Once the engine has been warmed up, the oxygen ($O_2$) concentration related feedback control is resumed. However, it takes a long period of time until the catalytic converter develops its efficient performance, and during the long period of time, emissions are extremely poor.

Figure 1:
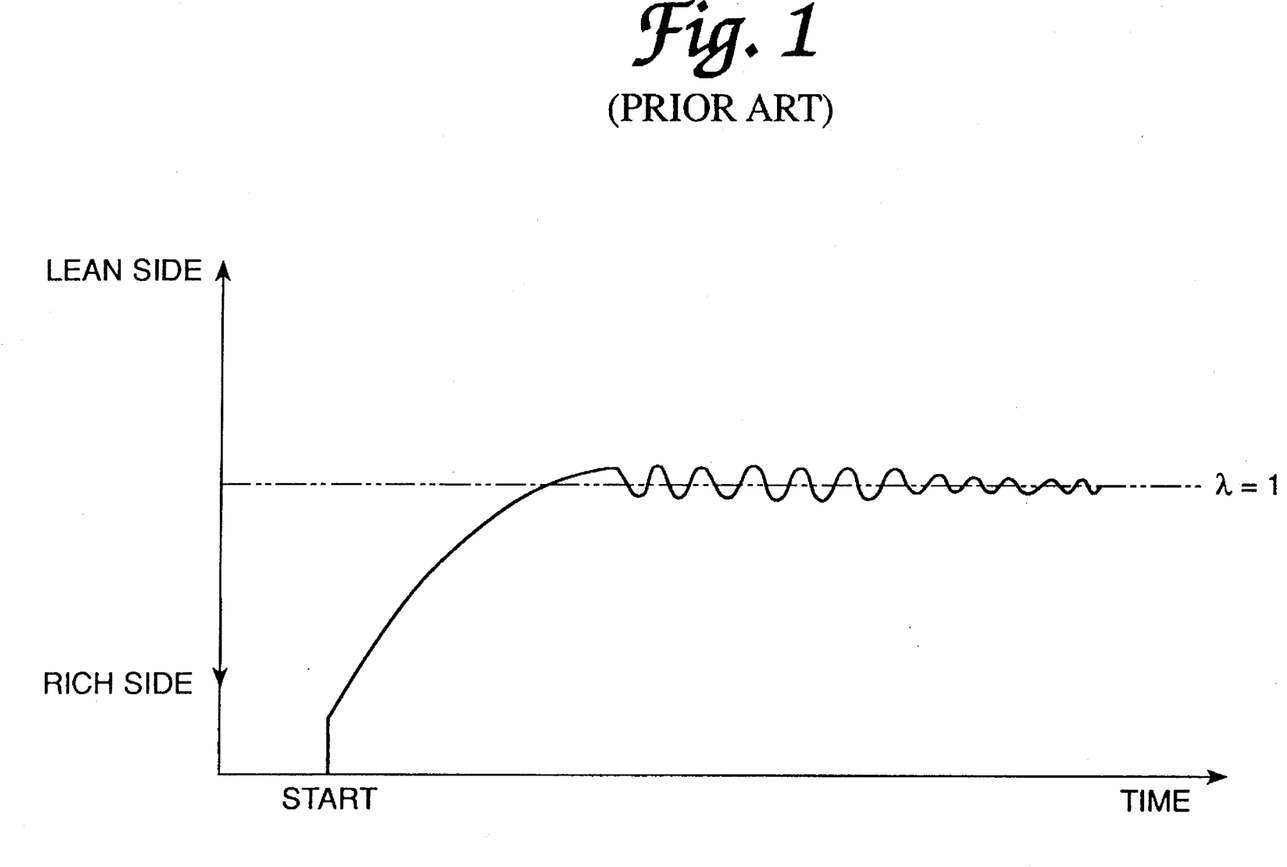
FIG. 1 is a diagram showing a change in air-fuel ratio caused by a prior art of oxygen ($O_2$) concentration related air-fuel ratio feedback control.

In recent years, air-fuel ratio control systems have been proposed, which enables a three-way catalytic converter to develop its efficient performance of exhaust gas purification even during engine warming-up as a result of coercively causing alternative deflections of an air-fuel ratio toward richer and leaner sides by a specified rate during the oxygen ($O_2$) concentration related feedback control, as shown in FIG. 1. Such an air fuel ratio control system is known from, for instance, Japanese Unexamined Patent Publication No. 2-230935.

In other words, it has been proved that, even before catalytic converters have become sufficiently activated, when the air-fuel ratio control is made to cause large coercive deflections in exhaust gas air-fuel ratio from the theoretically ideal air-fuel ratio of =1, the catalytic converters are enabled to purify a part of exhaust gas. This is because, when the emission air-fuel ratio is changed toward the richer side, oxygen ($O_2$) completely disappears from the surface of catalyst and reduction or deoxidation is significantly provided and, conversely, when it is changed toward the leaner side, chemical reaction is accompanied by accelerated oxidation thanks to the presence of a sufficient quantity of oxygen ($O_2$), resulting in improved purification of pollutants, such as hydrocarbons (HC), carbon monoxide (CO) and nitrogen oxides ($NO_x$).

However, with this air-fuel ratio control system described in the above-mentioned publication, as the temperature of exhaust gas rises with the progress of engine warming-up, it is rendered difficult to restore an air-fuel ratio into the allowed range (window) of the theoretical air-fuel ratio of $\lambda=1\pm a$ due to large coercive deflections.

SUMMARY OF THE INVENTION

The above object of the present invention is accomplished by providing an air-fuel control system for an internal combustion engine in which an air-fuel ratio feedback control is executed on the basis of an oxygen concentration in the exhaust gas to converge an air-fuel ratio toward a desired target air-fuel ratio most suitable for a satisfactory exhaust gas purifying efficiency of an exhaust gas purifying device, such as a three-way catalytic converter, and which coercively deflects the air-fuel ratio toward a richer side or a leaner side during an execution of the air-fuel ratio feedback control. The extent or amplitude of coercive deflection of the air-fuel ratio is increased when the progress of activation of the exhaust gas purifying device is still less than a predetermined desirable level and, on the other hand, it is gradually decreased with the progress of activation of the exhaust gas purifying device. Further, in the air-fuel ratio control system, a coercive deflection of the air-fuel ratio is fixed to a specific amplitude for a specific execution time at a start of the engine and, after the elapse of the execution time, it is changed smaller in amplitude. This execution time is established such that the longer it is, the lower the temperature of the engine is.

Accordingly, even before the engine has been warmed up sufficiently to make the catalyst active, the air-fuel ratio variable control, which is conducted while the oxygen concentration related air-fuel feedback control takes place, causes the catalyst to develop an oxygen storage effect accompanied by exhaust gas purification. On the other hand, after the sufficient warming up of the engine which provides a sufficient activation of the catalyst, the amplitude of deflection of the air-fuel ratio declines, so as to improve the convergency of the air-fuel ratio toward the target air-fuel ratio. As a result, the air-fuel ratio control system of the present invention enables the catalyst to perform exhaust gas purification regardless whether or not the engine has been warmed up and whether or not the catalyst has been activated, so as to provide a measurable improvement in emission over a wide range of driving conditions and, in addition, realizes a favorable convergency of the air-fuel ratio toward the theoretical air-fuel ratio after the activation of the catalyst, so as to prevent emission deterioration after the engine reaches a relatively high temperature. Furthermore, since reactive heat is generated in the catalyst while the temperature of engine is low before sufficient warming up, activation of the catalyst progresses more efficiently.

An air-fuel ratio control system for an internal combustion engine in which an air-fuel ratio is feedback controlled for converging toward a target air-fuel ratio which provides a satisfactory exhaust gas purifying efficiency of an exhaust gas purifying device, on the basis of an oxygen concentration in an exhaust gas. The air-fuel ratio control system includes activation detecting apparatus for detecting progress of activation of the exhaust gas purifying device and control apparatus for establishing a differential control value larger before progress of activation of the exhaust gas purifying device has reached a predetermined level than after it has reached the predetermined level.

BRIEF DESCRIPTION OF THE DRAWINGS

The above and other objects and features of the present invention will be clearly understood from the following description directed to preferred embodiments thereof when considered in conjunction with the accompanying drawings, in which.

DETAILED DESCRIPTION OF THE PREFERRED EMBODIMENT

Figure 2:
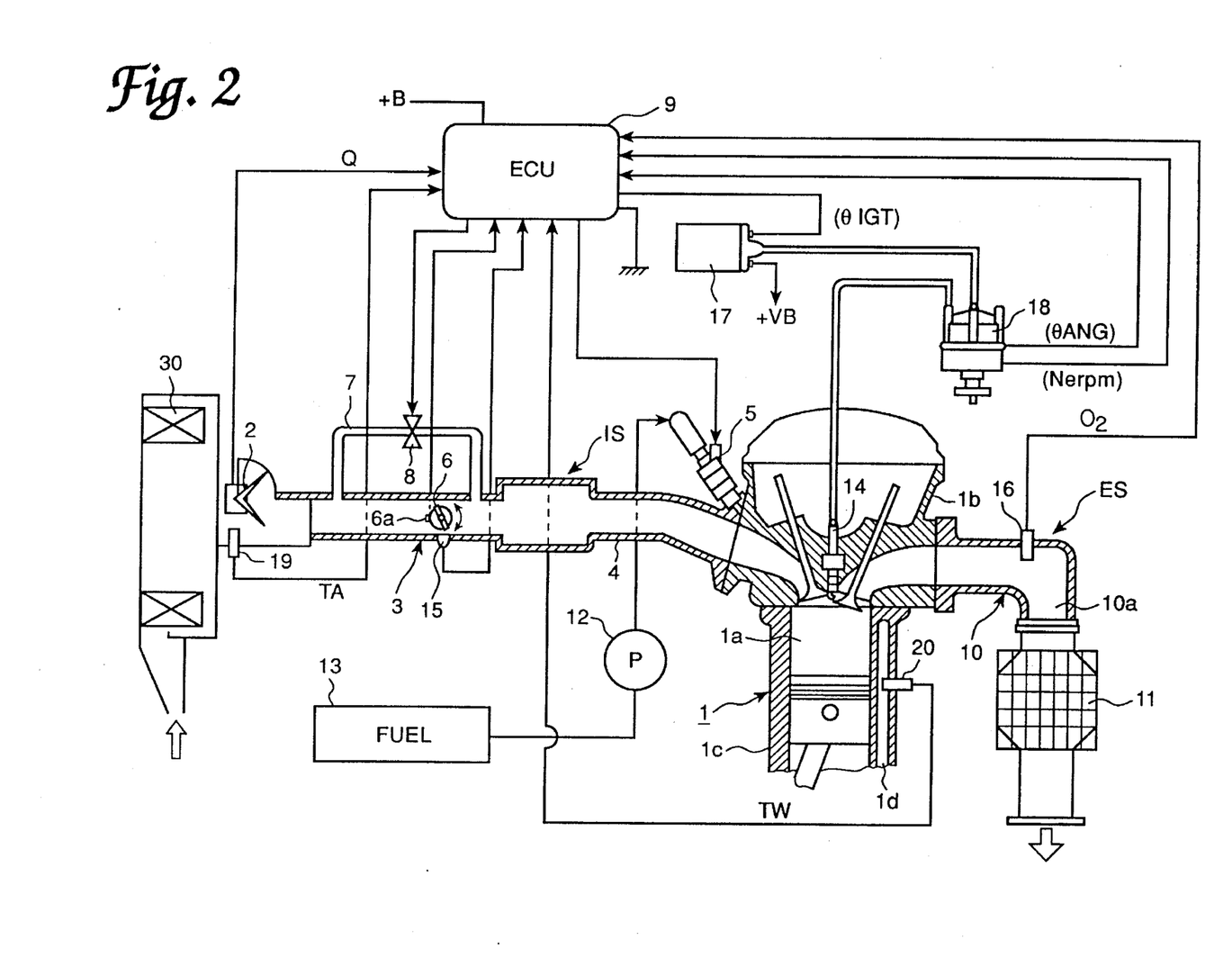
FIG. 2 is a diagram showing an air-fuel control system for an engine in accordance with a preferred embodiment of the present invention.

Referring to the drawings in detail, in particular, to FIG. 2, the configuration of an air-fuel ratio control system in accordance with a preferred embodiment of this invention is shown as being in cooperation with a four cylinder internal combustion engine by way of example. A four cylinder internal combustion engine 1 has an intake system IS including an intake pipe 4. This intake pipe 4 is provided with an air cleaner 30 at its upstream end and an air-flow meter 2 immediately downstream from the air cleaner 30, and formed with a throttle chamber 3 between the air-flow meter 2 and the engine 1. There are further provided a throttle valve 6 attached with a opening sensor 6a, installed within the throttle chamber 3, which is operated by a driver through a linkage with an accelerator pedal (not shown), and a temperature sensor 19, disposed after the air cleaner 30, for detecting the temperature of intake air TA. Air is introduced into cylinders 1a of the engine 1 through the intake pipe 4 via the air cleaner 30. The engine further has a fuel injector 5, disposed in the close proximity to an intake port 1b of the engine 1 through which fuel, delivered from a fuel tank 13 by means of a fuel pump 12, is injected into the cylinder 1a. According to depressed strokes of the accelerator pedal during travelling of the vehicle, the amount of intake air Q introduced into the cylinder 1a is controlled, or increased or decreased, by the throttle valve 6. This throttle valve 6 is held at a minimum opening (full close) during deceleration and during idling. An idle switch 15, provided in cooperation with the throttle valve 6, is turned on when the throttle valve 6 is brought into its minimum opening. The intake pipe 4 is provided with a bypass pipe 7 bypassing the throttle chamber 3, and hence the throttle valve 6. This bypass pipe 7 is provided with an electromagnetic valve 8 which, when idling or when supply of dash pot air is made, intake air passed through the air flow meter 2 is forced to flow through the bypass pipe 7 and is directed to the cylinder. The amount of intake air flowing through the bypass pipe 7 is regulated by means of the electromagnetic valve 8. Opening and closing of the electromagnetic valve 8 is controlled with the duty ratio D of a control signal provided by means of an engine control unit (ECU) 9.

Engine 1 further has an exhaust system ES including an exhaust pipe 10 forming an exhaust gas passage 10a. This exhaust pipe 10 is provided with a three-way catalytic converter 11 in the passage 10a and an oxygen ($O_2$) sensor 16, disposed in the exhaust pipe 10 upstream from the catalytic converter 11, for detecting the concentration of oxygen, which is representative of an air-fuel ratio (A/F) and is called an emission air-fuel ratio, within the exhaust gases flowing within the exhaust pipe 10. This oxygen ($O_2$) sensor 16 is designed and adapted to develop a high electrical voltage Vo when the exhaust gas air-fuel ratio (A/F) is higher than the theoretical air-fuel ratio (A/F=14.7 or $\lambda$=1) and, on the other hand, a low electrical voltage Vo when it is less than the theoretical air-fuel ratio (A/F=14.7 or $\lambda$=1). That is, the electrical voltage Vo of the oxygen ($O_2$) sensor 16 is reversed with respect to the slice level SL, which is specified corresponding to the theoretical air-fuel ratio (A/F=14.7 or $\lambda$=1), between higher and lower emission air-fuel ratios than the theoretical air-fuel ratio. The oxygen ($O_2$) sensor 16 develops an electrical voltage Vo greatly changing, in particular, in the vicinity of the slice level SL.

Figure 4:
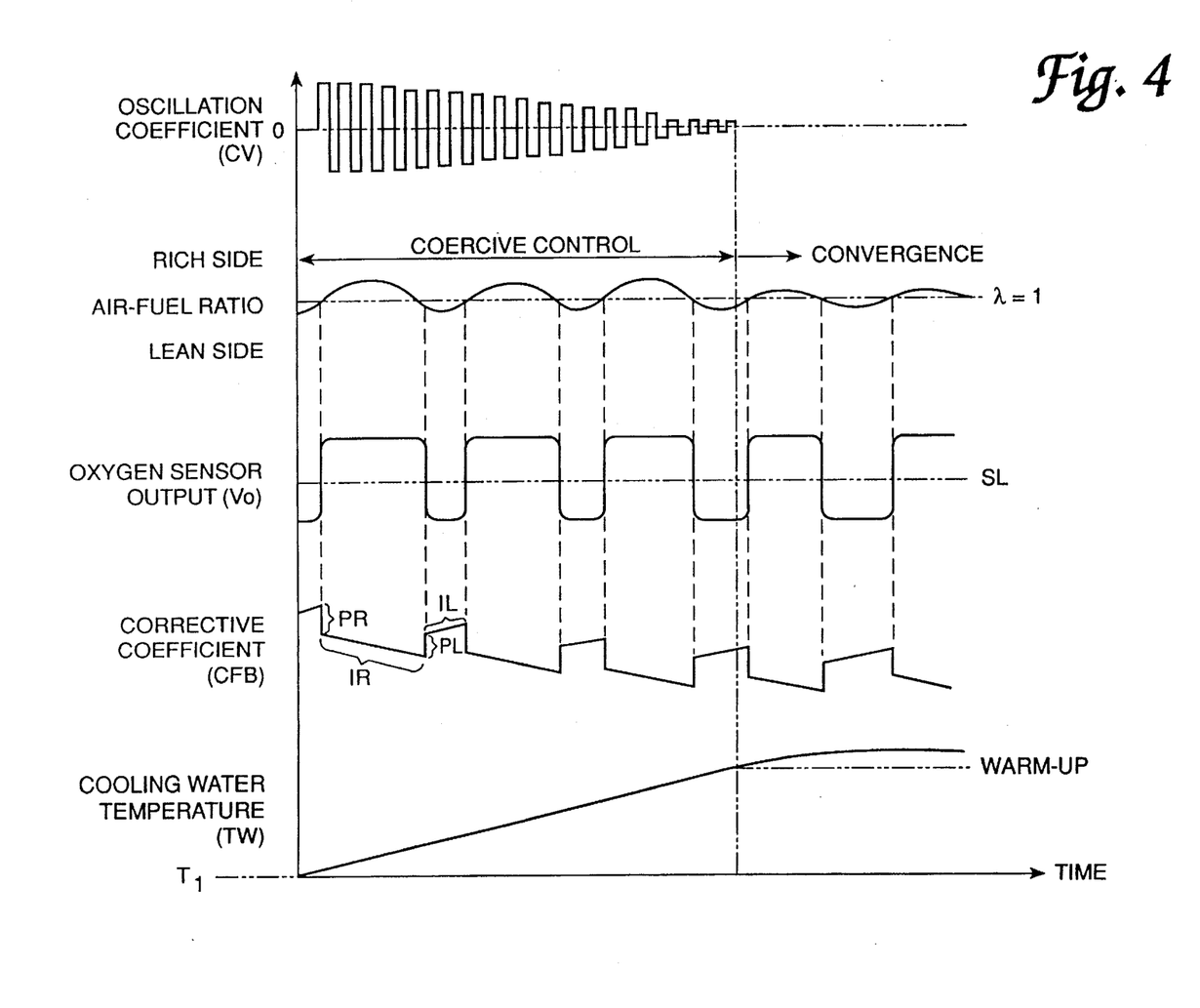
FIG. 4 is a time chart showing various control factors.

The engine control unit (ECU) 9 compares an output voltage Vo of the oxygen (O₂) sensor 16 with a standard voltage level, i.e. the slice level SL. As a result of that comparison, when the output voltage Vo is higher than the slice level SL, the engine control unit (ECU) 9 judges the actual air/fuel ratio to be on the richer side and reduces the amount of fuel to be delivered into the engine 1. Conversely, when the output voltage Vo is lower than the slice level SL, the engine control unit (ECU) 9 judges the actual air/fuel ratio to be on the leaner side and increases the amount of fuel to be delivered into the engine 1. In such a way, an oxygen concentration related feedback control is exercised over the actual air-fuel ratio to maintain it as close to the theoretical air-fuel ratio (A/F=14.7 or $\lambda$=1) as possible. On the other hand, in the oxygen concentration related feedback control, when the temperature of engine cooling water TW is less than a specified standard level of temperature T1, i.e., the engine 1 is not yet warmed up sufficiently, the amount of fuel to be delivered is coercively varied as will be described later so as to cause alternative deflections in air-fuel ratio by a specific level toward the richer side and the leaner side in a specific cycle, as shown in FIG. 4. This causes the catalyst to exhibit what is called an "oxygen (O₂) storage effect", whereby, even if the catalytic converter has not yet become activated, it provides the desirable effect of exhaust gas purification and promotes its own catalytic activation thanks to reactive heat generated through the exhaust gas purification.

Engine 1 has spark plugs 14 embedded in a cylinder head 1a to which a desired voltage of spark pulses are impressed through an ignitor 17 and a distributor 18. A spark pulse is impressed at a timing, i.e., an ignition timing, controlled by means of an ignition signal θ IGT, which is sent to the igniter 17 from the engine control unit (ECU) 9. The engine 1 is provided with a temperature sensor 20, installed in a water jacket 1d of a cylinder block 1c, for detecting the temperature of coolant, such as cooling water, TW.

Engine control unit (ECU) 9 is composed of a microcomputer, such as a central processing unit (CPU), which comprises the central operational element, and contains various control circuits for controlling the amount of intake air Q, the amount of injected fuel, an ignition timing θ IGT, a valve timing, etc., memories, such as a read only memory (ROM) and a random access memory (RAM), and an interface (I/O) circuit. Through the interface (I/O) circuit, the engine control unit (ECU) 9 receives various signals in addition to the signals described above, such as an engine start signal (an ECU trigger signal) from a starter switch (not shown), an engine speed signal Ne from an engine speed sensor installed in the distributor 18, and a throttle opening signal TVO from the throttle opening sensor 6a, all of which are essential to control the engine 1. The air-fuel control system, which is organized in an electronic fuel injection control system of the engine control unit (ECU) 9, determines, on one hand, a basic pulse width of fuel injection pulse Tpk based upon an engine speed Ne and an intake air quantity Q and, on the other hand, detects an actual air-fuel ratio A/F by the aid of the oxygen (O₂) sensor 16 and performs an oxygen concentration related feedback control so as to correctly change the basic pulse width of fuel injection pulse Tpk according to the deviation between an target air-fuel ratio and the actual air-fuel ratio, thereby maintaining the target air-fuel ratio.

In the air-fuel ratio control system, the general formula for calculating an effective pulse width of fuel injection pulse Ti, upon which the amount of fuel delivered by the fuel injector 5 depends, is expressed as follows:

$$Ti = Tpk(1 + CFB + CV + CW) + TV \quad (I)$$

where Tpk is the basic pulse width of fuel injection pulse;
CFB is the corrective coefficient for air-fuel ratio feedback control based on an oxygen (O₂) concentration;
CV is the oscillation coefficient of air-fuel ratio for variable air-fuel ratio control;
CW is the corrective coefficient based on the temperature of engine cooling water; and
TV is the ineffective width of fuel injection pulse.

This feedback control of air-fuel ratio is conducted and accomplished on the basis of the output of the oxygen (O₂) sensor 16 in the event that required feedback control conditions are achieved, for instance, that the speed of engine Ne and the load of engine (throttle opening) are within specified limits, i.e. in the feedback conducting zone of air-fuel ratio A/F.

A balanced relationship is maintained among an air-fuel ratio A/F, the output voltage Vo of the oxygen (O₂) sensor 16, and the air-fuel ratio feedback corrective coefficient CFB, as generally shown in FIG. 4.

Referring to FIG. 4, when an air-fuel ratio A/F deflects on the richer side, the output voltage Vo of oxygen (O₂) sensor 16 leaps up. Then, the engine control unit (ECU) 9 receives the output signal Vo and changes the feedback corrective coefficient CFB initially by a proportional decrement of PR and subsequently, causes the integrated value IR to decline gradually so as to shift the air-fuel ratio toward the lean side. Such a decline of the integrated value IR induces a downward change in the amount of fuel to be delivered into the engine 1, so that the air-fuel ratio shifts toward the leaner side beyond the theoretical air-fuel ratio ($\lambda$=1) before long. When this happens, the output signal Vo of oxygen (O₂) sensor 16 drops down lower than the slice level SL. Subsequently, when the engine control unit (ECU) 9 receives this output signal Vo, it changes the feedback corrective coefficient CFB initially by a proportional increment of PL, and following that, causes the integrated value IL to rise up gradually so as to shift the air-fuel ratio toward the rich side. This results in an increase in the amount of fuel to be delivered into the engine 1, so as to allow the air-fuel ratio A/F shift toward the richer side beyond the theoretical air-fuel ratio ($\lambda$=1), causing the output signal Vo of oxygen (O₂) sensor 16 to leap up. Further, when the engine control unit (ECU) 9 receives this leaped output signal Vo, it causes the feedback corrective coefficient CFB to fall again. In such a manner, a negative feedback control is constantly exerted on the air-fuel ratio A/F. Because, in the event that a fuel mixture is rich as a whole, a time during which the air-fuel ratio A/F is held on the rich side sufficiently to indicate that the fuel mixture is rich is longer than that during which it is held on the lean side sufficiently to indicate that the fuel mixture is lean, the output signal Vo of oxygen (O₂) sensor 16 is held above the slice level SL for an increased period of time and consequently, the feedback corrective coefficient CFB gradually declines little by little. In such a manner, the air-fuel ratio A/F gradually converges closely to and is balanced in the vicinity of the theoretical air-fuel ratio ($\lambda$=1).

Figure 3:
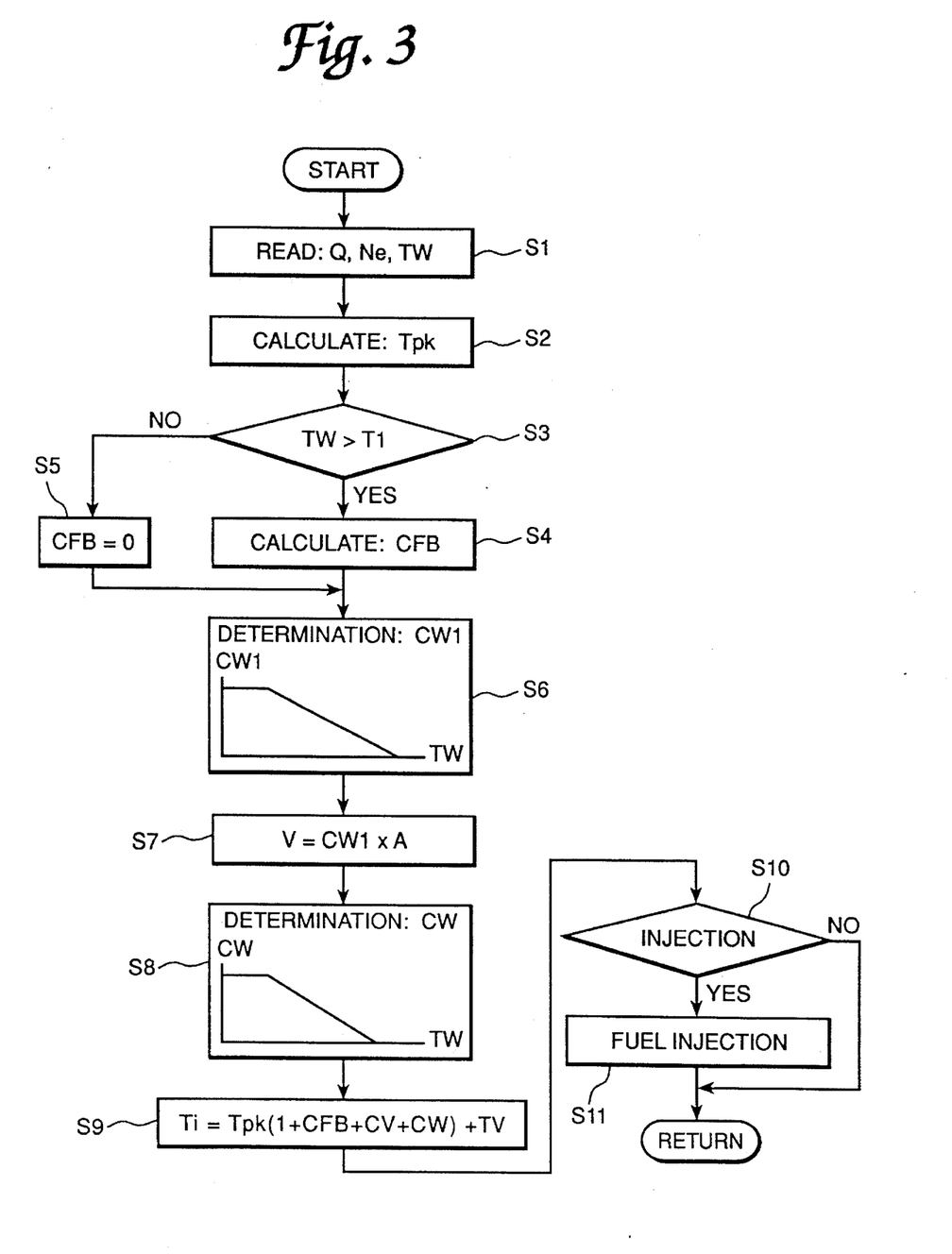
FIG. 3 is a flow chart illustrating the air-fuel control sequential routine for an engine control unit.

The operation of the air-fuel control system depicted in FIG. 2 will be clearly understood by reviewing FIG. 3 which is a flow chart illustrating the air-fuel ratio control sequential routine.

When starting of engine 1 is detected and a trigger signal is provided, various control parameters, including the amount of intake air Q detected by the air-flow meter 2, an engine speed Ne detected by the distributor 18, the temperature of engine cooling water TW detected by the temperature sensor 20, and the output signal Vo of oxygen (O₂) sensor 16, are read in at step S1. At step S2, a calculation is made of the basic pulse width of fuel injection pulse Tpk, on the basis of the parameters of intake air amount Q and engine speed Ne.

Subsequently, at step S3, a determination is made as to whether or not the temperature of cooling water TW at the engine start is greater than a specified standard temperature of engine cooling water T1 which is predetermined to be lower than an active temperature above which the three-way catalytic converter 11 is active. If the answer to the decision is "YES," i.e. if the temperature of engine cooling water TW is higher than the specified standard temperature of engine cooling water T1, this indicates that the three-way catalytic converter 11 is still during the course of activation or it has been sufficiently activated, then, the control proceeds to step S4 where the corrective coefficient CFB for air-fuel ratio feedback control is calculated based on a variation between the slice level SL representative of a target air-fuel ratio ($\lambda=1$) and the output Vo of oxygen ($O_2$) sensor 16. On the other hand, if the answer to the decision is "NO," i.e. if the temperature of engine cooling water TW is lower than the specified standard temperature of engine cooling water T1, then, at step S5, the corrective coefficient CFB for air-fuel ratio feedback control is fixed or clamped at zero (0) so as to conduct an open loop control of air-fuel ratio.

After determining an amplitude of deflection of air-fuel ratio CW1 for a coercive air-fuel ratio variable control, which is called a "dither control," according to the temperature of engine cooling water TW at step S6, an oscillation coefficient CV, upon which a coercive deflection of air-fuel ratio depends in a variable air-fuel ratio control, is subsequently obtained at step S7. This determination of the amplitude of deflection of air-fuel ratio CW1 is made with reference to a deflection map. In this instance, this deflection map is prepared such that the coercive air-fuel ratio deflection amplitude CW1 takes a value becoming smaller with an increase in the temperature of engine cooling water TW. Accordingly, the coercive air-fuel ratio deflection amplitude CW1 is declined as the temperature of engine cooling water TW rises, i.e. with the progress of engine warming-up, and hence, the progress of activation of the three-way catalyst. Further, the maximum air-fuel ratio deflection amplitude CW1 is restricted to be of a value corresponding to 10 to 20% of the theoretical air-fuel ratio ($\lambda=1$) in order to avoid variations in air-fuel ratio in excess. The oscillation coefficient CV is calculated by multiplying the air-fuel ratio deflection amplitude CW1 by a constant A. The constant A is provided by controlling an oscillator generating a clock pulse on a specified frequency and takes a value of +1 or −1. This frequency is established approximately five times as high as the frequency of the air-fuel feedback control. Following the determination of oscillation coefficient CV, a corrective coefficient CW is determined based on the temperature of engine cooling water TW with reference to a coefficient map at step S8. In this instance, this coefficient map is prepared such that the corrective coefficient CW takes a value becoming smaller with an increase in the temperature of engine cooling water TW so as to shift an air-fuel ratio toward the rich side when the engine is started at lower temperatures, thereby promoting warming-up of the engine 1.

Thereafter, an effective pulse width of fuel injection pulse Ti is calculated based upon the basic pulse width of fuel injection pulse Tpk, the air-fuel ratio feedback control corrective coefficient CFB, the oscillation coefficient CV, and the corrective coefficient CW, at step S9. Subsequent to a determination as to the advent of fuel injection timing at step S10, the fuel injector 5 is driven to deliver the amount of fuel depending upon the effective fuel injection pulse width Ti at step S11.

As was previously described, while the catalyst has not yet been sufficiently activated, changing the emission air-fuel ratio, represented by an oxygen concentration in the exhaust gases, greatly from the theoretical air-fuel ratio ($\lambda=1$) enables the catalyst to purify a portion of the exhaust gases. This effect is caused such that, when the air-fuel ratio causes a deflection toward the richer side, oxygen ($O_2$) completely disappears from the surface of three-way catalyst and a significant deoxidation or reduction is caused and, conversely, when it causes a deflection toward the leaner side, chemical reaction is accompanied by an accelerated oxidation due to the presence of a sufficient quantity of oxygen on the surface of three-way catalyst, resulting in an improvement of purification of pollutants, such as hydrocarbons (HC), carbon monoxide (CO), and nitrogen oxides ($NO_x$). However, large coercive deflections of air-fuel ratio enhance the demerit that the air-fuel ratio A/F becomes deviated from the window of theoretical air-fuel ratio ($\lambda=1\pm a$) with an increase in the temperature of three-way catalyst, and the air-fuel ratio is rendered difficult to converge toward the theoretical air/fuel ratio ($=1\pm a$). For this reason, with the air-fuel control system in accordance with the present invention, the air-fuel feedback control is performed so that, with the progress of engine warming-up, i.e. activation of the three-way catalytic converter 11, the deflection of air-fuel ratio itself declines, thereby improving the convergency of air-fuel ratio towards the theoretical air-fuel ratio ($=1$). In addition, that phenomenon is accompanied by a synergistic, beneficial effect that activation of the catalyst is accelerated by means of an increase in the rate of temperature increase of three-way catalytic converter 11 due to heat of the reaction of three-way catalytic converter 11. In addition, the improvement in the ratio of purification resulting from changes of air-fuel ratio is remarkably observed when utilization is made of an palladium (Pd) group of catalysts and, consequently, it is desirable for the air-fuel control system to be configured in combination with the palladium (Pd) group of catalysts.

Figure 5:
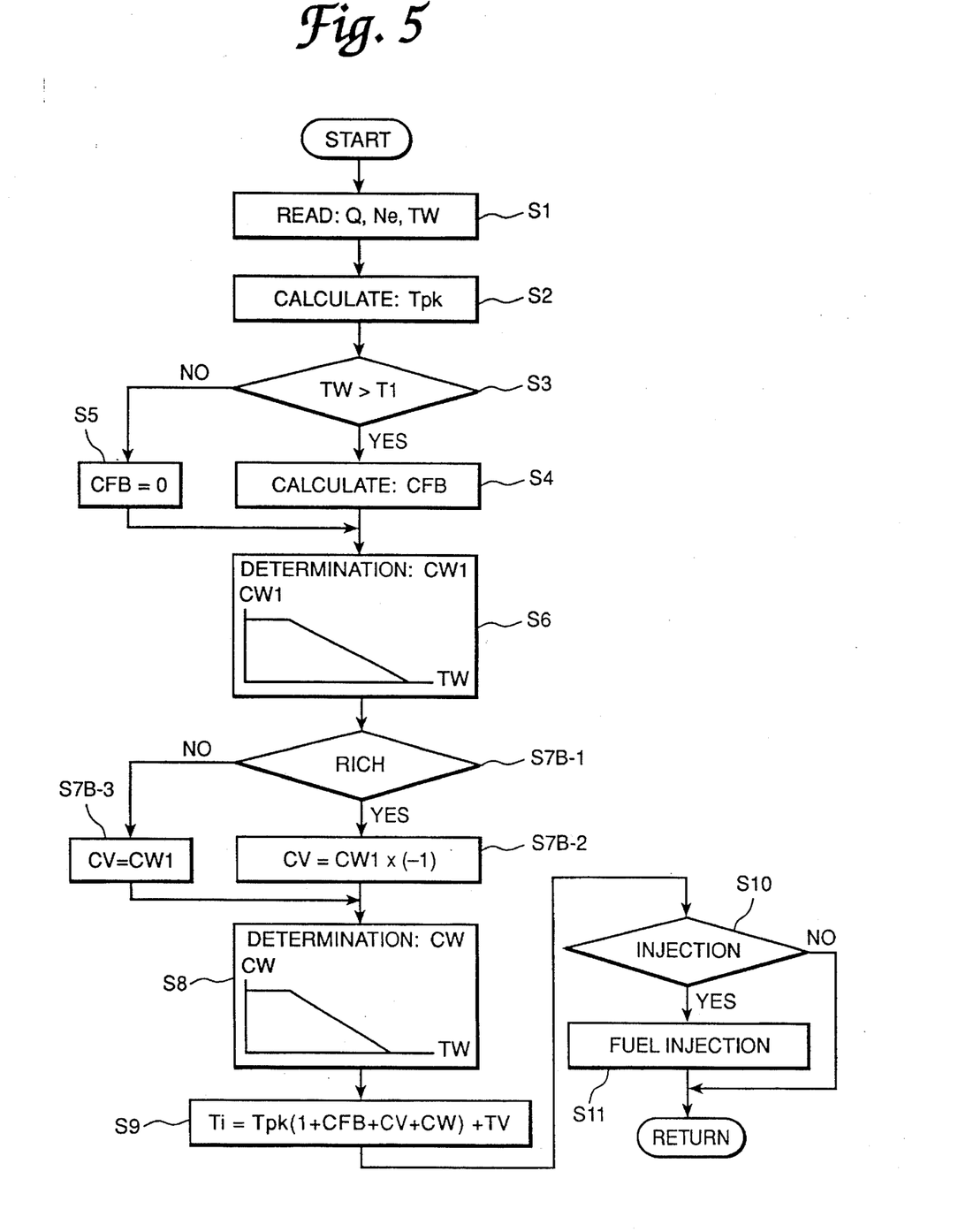
FIG. 5 is a flow chart illustrating an air-fuel control sequential routine for an engine control unit according to another preferred embodiment of the present invention.

Referring to FIG. 5, a flow chart illustrating an air-fuel ratio control sequential routine in accordance with another preferred embodiment of the present invention is shown, in which an oscillation coefficient CV of air-fuel ratio for a variable air-fuel ratio control is differently established according to emission air-fuel ratios represented by output signals Vo of the oxygen ($O_2$) sensor 16. Steps S1 to S6 and S9 to S11 in this flow chart are just the same as them in the flow chart shown in FIG. 3, so that the following description will be directed to steps S7B-1–S7B-3.

After the determination of an amplitude of deflection of air-fuel ratio CW1 at step S6, a decision is made based on an output signal Vo from the oxygen sensor 16 at step S7B-1 as to whether an actual air-fuel ratio A/F is on the richer side. If the answer to the decision is "YES," then, an oscillation coefficient CV is subsequently calculated by multiplying the air-fuel ratio deflection amplitude CW1, obtained at step S7B-2, by a constant A. In this instance, the constant A takes a value of −1 so as to cause the air-fuel ratio toward the lean side. On the other hand, if the answer to the decision is "NO," this indicates that the air-fuel ratio is rather on the lean side, then, the air-fuel ratio deflection amplitude CW1 (positive value) determined at step S6 is used as an oscillation coefficient CV so as to cause the air-fuel ratio toward the rich side. Thereafter, according to an effective pulse width of fuel injection pulse Ti calculated based upon the basic pulse width of fuel injection pulse Tpk, the air-fuel ratio feedback control corrective coefficient CFB, the oscillation coefficient CV, and the corrective coefficient CW, at step S9, the fuel injector 5 is driven to deliver the amount of fuel depending upon the effective fuel injection pulse width Ti at step S11 at an appropriate injection timing.

Figure 6:
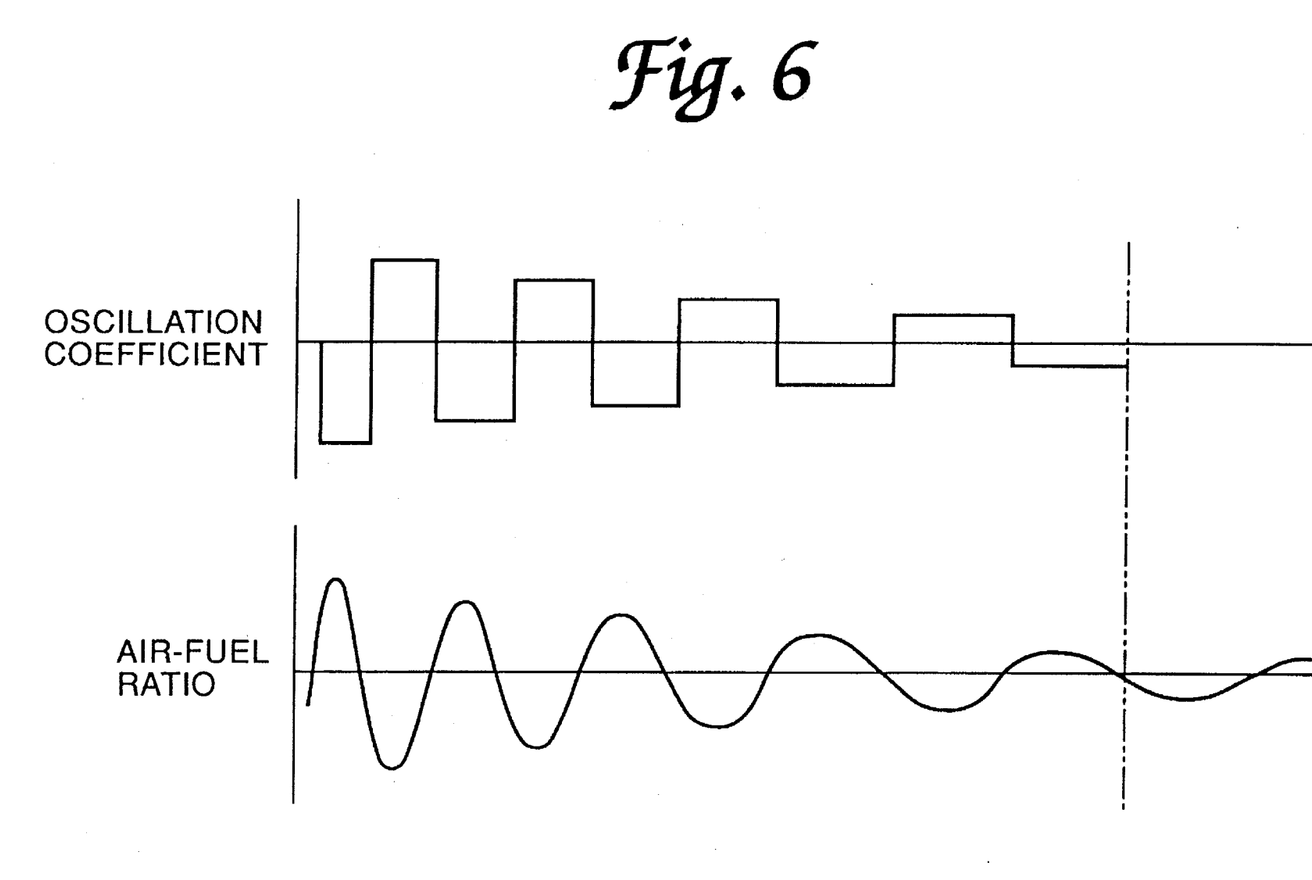
FIG. 6 is a diagram showing the relation between an oscillation coefficient and an air-fuel ratio.

Because, with this air-fuel ratio control system, due to the weighing of oscillation coefficient CV, the frequency of deflection of the actual air-fuel ratio A/F is increased as shown in FIG. 6. As a result, the three-way catalytic converter 11 is potentially improved in exhaust gas purification performance while it has not yet been activated. However, since, with the progress of activation of the catalytic converter 11, and hence, with an increase in the temperature of engine cooling water TW, the oscillation coefficient CV declines, both frequency and amplitude of deflection of actual air-fuel ratio A/F gradually falls down, so that the convergency of actual air-fuel ratio toward the target air-fuel ratio is as high as in the air-fuel ratio control system.

Figure 7:
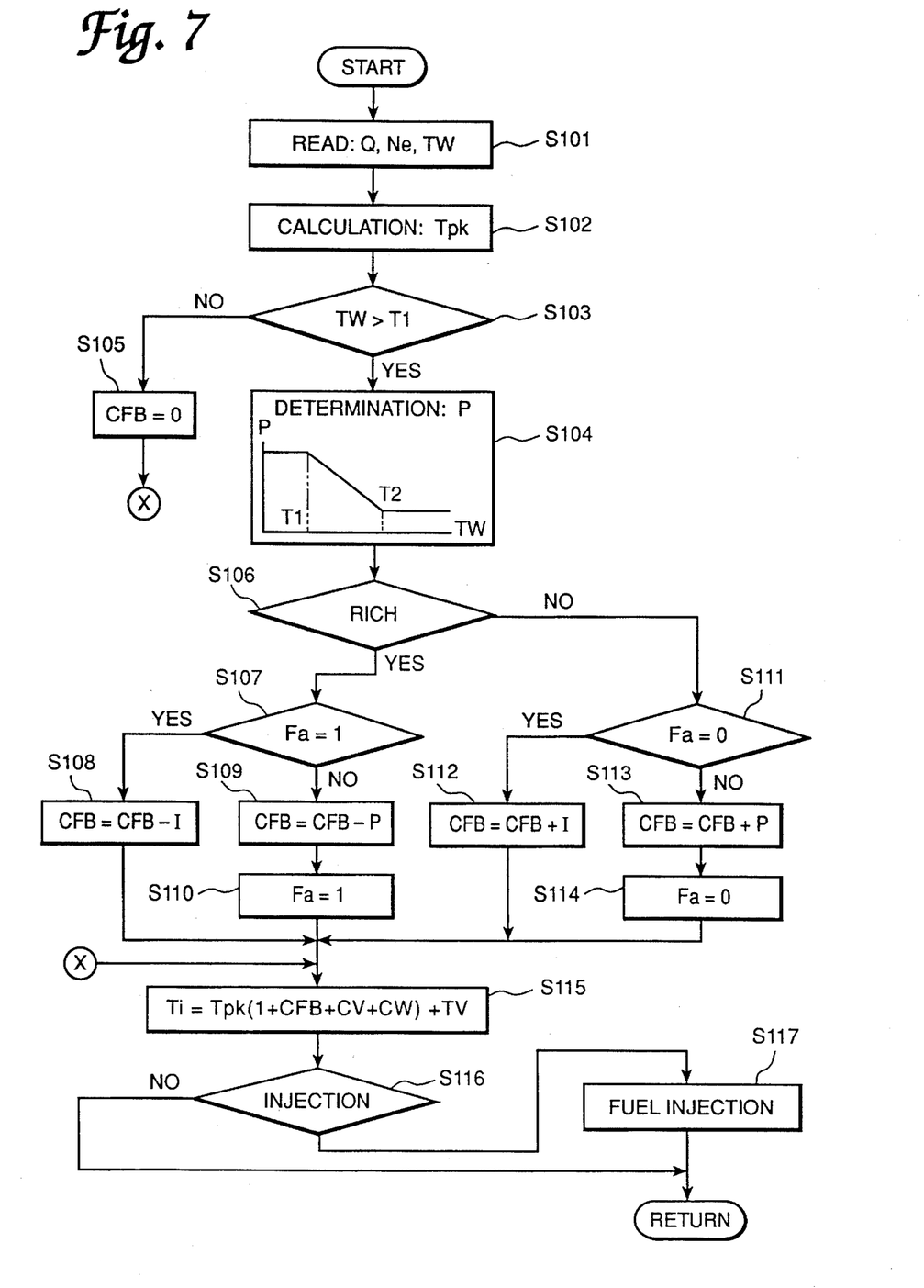
FIG. 7 is a flow chart illustrating an air-fuel control sequential routine for an engine control unit according to still another preferred embodiment of the present invention.

Referring to FIG. 7, a flow chart illustrating an air-fuel ratio control sequential routine in accordance with still another preferred embodiment of the present invention is shown, which is featured in that an actual air-fuel ratio is coercively deflected by regulating a proportional gain P of the corrective coefficient for air-fuel ratio feedback control based on an oxygen ($O_2$) concentration. When starting of engine 1 is detected and a trigger signal is provided, various control parameters, including the amount of intake air Q detected by the air-flow meter 2, an engine speed Ne detected by the distributor 18, the temperature of engine cooling water TW detected by the temperature sensor 20, and the output signal Vo of oxygen ($O_2$) sensor 16, are read in at step S101. At step S102, a calculation is made of the basic pulse width of fuel injection pulse Tpk, on the basis of the parameters of intake air amount Q and engine speed Ne.

Subsequently, at step S103, a determination is made as to whether or not the temperature of cooling water TW at the engine start is greater than a specified standard temperature of engine cooling water T1 which is predetermined to be lower than an active temperature above which the three-way catalytic converter 11 is active. If the answer to the decision is "YES," i.e. if the temperature of engine cooling water TW is higher than the specified standard temperature of engine cooling water T1, this indicates that the three-way catalytic converter 11 is still during the course of activation or it has been sufficiently activated, then, the control proceeds to step S104 where a proportional gain P for the corrective coefficient CFB for air-fuel ratio feedback control is determined based on the temperature of engine cooling water TW with reference to a proportional gain map. On the other hand, if the answer to the decision is "NO," i.e. if the temperature of engine cooling water TW is equal to or lower than the specified standard temperature of engine cooling water T1, then, at step S105, the corrective coefficient CFB for air-fuel ratio feedback control is fixed or clamped at zero (0) so as to conduct an open loop control of air-fuel ratio. In this instance, the proportional gain map is prepared such that the proportional gain P becomes smaller with an increase in the temperature of engine cooling water TW in the range from the specified standard temperature of engine cooling water T1 and a specific temperature T2 at which the three-way catalyst becomes activated.

Following the determination of proportional gain P, a decision is made at step S106 as to whether an actual air-fuel ratio A/F is on the richer side. If the answer to the decision is "YES," then, another decision is made at step S107 as to whether an air-fuel ratio flag Fa has been set to "1" in the preceding routine. This air-fuel ratio flag Fa is set to "1" when the emission air-fuel ratio represented by the output of oxygen sensor 16 is on the richer side and is set to "0" unless it is on the rich side. As a result of the decision, the corrective coefficient CFB for air-fuel ratio feedback control based on an oxygen ($O_2$) concentration is changed by a decrement of a value "I" at step S108 when in fact the emission air-fuel ratio was on the rich side or is changed by a decrement of a value "P" at step S109 when in fact the emission air-fuel ratio was not on the rich side. Subsequent to the decremental change by the value "P," the air-fuel ratio flag Fa is set to "1" at step S110. On the other hand, if the answer to the decision made at step S106 is "NO," then, another decision is made at step S111 as to whether the air-fuel ratio flag Fa has been set to "0" in the preceding execution of the control sequential routine. As a result of the decision, the corrective coefficient CFB is changed by an increment of the value "I" at step S112 when in fact the emission air-fuel ratio was not on the rich side or is changed by an increment of the value "P" at step S113 when the emission air-fuel ratio was on the rich side. Subsequent to the incremental change by the value "P," the air-fuel ratio flag Fa is set to "0" at step S114.

After setting the air-fuel ratio flag Fa to "1" at step S110 or "0" at step S114, or subsequent to the setting of the corrective coefficient CFB to zero (0) at step S105, an effective pulse width of fuel injection pulse Ti is calculated at step S115. Then, the fuel injector 5 is driven to deliver the amount of fuel depending upon the effective fuel injection pulse width Ti at step S117 at an appropriate injection timing.

With this air-fuel ratio control, while the three-way catalyst has not yet been activated, the corrective coefficient CFB becomes large through the regulation of proportional gain "P," so as to provide an increase in the frequency of deflection of the air-fuel ratio, thereby improving the purification performance of the three-way catalyst. However, with the progress of activation of the three-way catalyst, the proportional gain "P" falls down. This causes a gradual decline of both frequency and amplitude of deflection of the air-fuel ratio, so that the convergency of actual air-fuel ratio toward the target air-fuel ratio is as high as in the air-fuel ratio control system.

Figure 8:
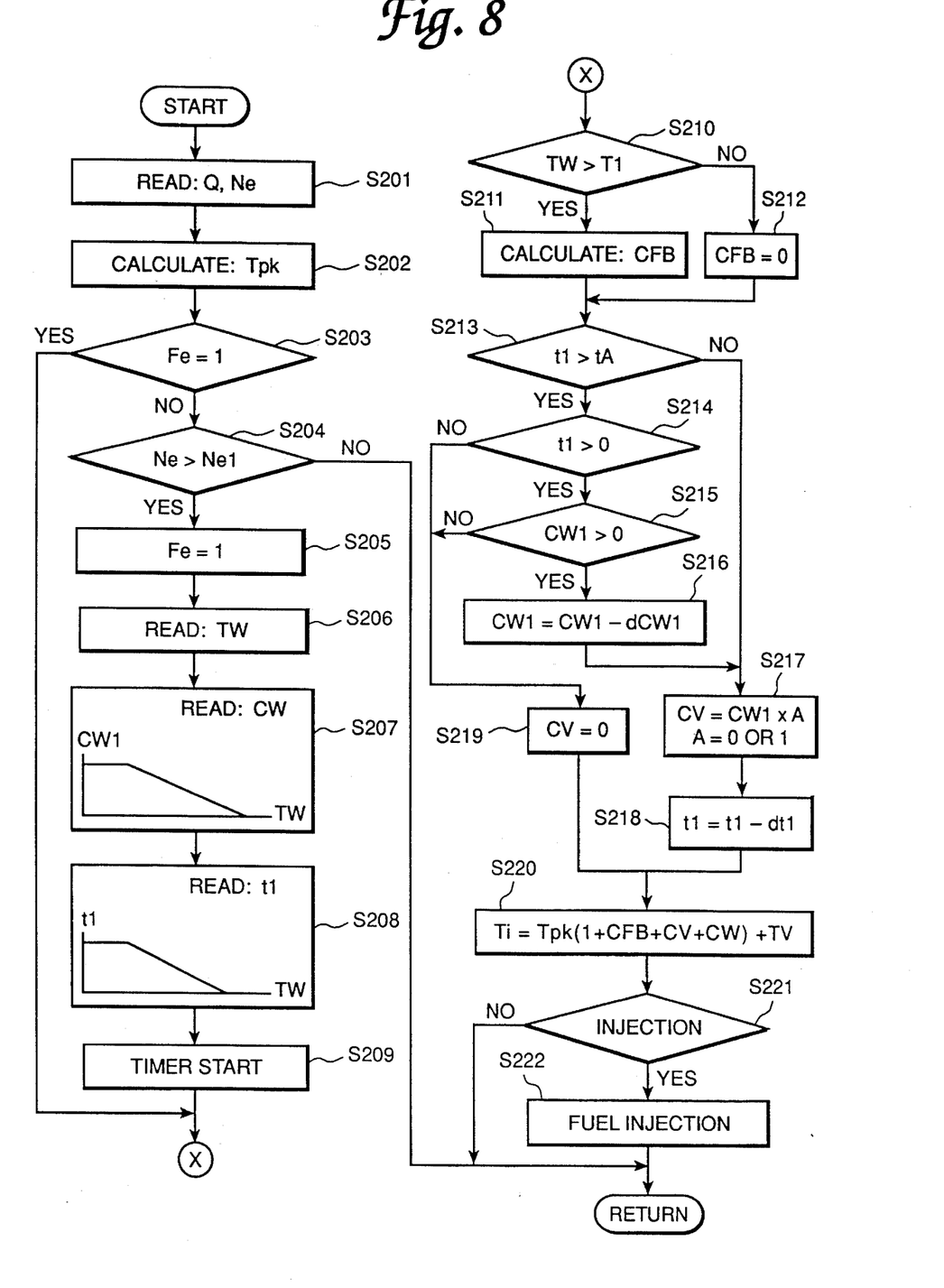
FIG. 8 is a flow chart illustrating an air-fuel control sequential routine for an engine control unit according to a further preferred embodiment of the present invention.

Referring to FIG. 8, a flow chart illustrating an air-fuel ratio control sequential routine in accordance with still another preferred embodiment of the present invention is shown, which is featured in that an actual air-fuel ratio is coercively deflected according to the temperature of engine cooling water TW at the start of engine.

When starting of engine 1 is detected and a trigger signal is provided, various control parameters, including the amount of intake air Q detected by the air-flow meter 2, an engine speed Ne detected by the distributor 18, the temperature of engine cooling water TW detected by the temperature sensor 20, and the output signal Vo of oxygen ($O_2$) sensor 16, are read in at step S201. At step S202, a calculation is made of the basic pulse width of fuel injection pulse Tpk, on the basis of the parameters of intake air amount Q and engine speed Ne.

Subsequently, at step S203, a determination is made as to whether or not an engine start flag Fe has been set to "1" in the preceding control sequential routine. This engine start flag Fe is set to "1" when the engine 1 is started and is set to "0" when it is not started. If the answer to the decision is "NO," this indicates that the engine had not been started in the preceding execution of the control sequential routine, then, a decision is made at step S204 as to whether the engine has started. This decision is made by comparing a current engine speed Ne with a predetermined speed Ne1 of, for example, approximately 300 rpm. When the current engine speed Ne is higher than the predetermined speed Ne1, it is determined that the engine has been started. If the answer to the decision is "YES," then, after setting the engine start flag Fe to "1" at step S205, the temperature of engine cooling water TW is read in at step S206. Subsequent to determining of an amplitude of deflection of air-fuel ratio CW1 for a coercive air-fuel ratio variable control according to the temperature of engine cooling water TW with reference to a deflection map at step S207, a time t1 for which a coercive air-fuel ratio variable control is executed with the air-fuel ratio deflection amplitude CW1 is determined according to the temperature of engine cooling water TW with reference to a coercive control execution time map at step 208. This coercive control execution time map is prepared such that the coercive control execution time t1 is established to become smaller with an increase in the temperature of engine cooling water TW.

After starting of a timer to count down the coercive control execution time t1 at step S209, a decision is made at step S210 as to whether the temperature of cooling water TW is greater than a specified standard temperature of engine cooling water T1 which is predetermined to be lower than an active temperature above which the three-way catalytic converter 11 is active. If the answer to the decision is "YES," i.e. if the temperature of engine cooling water TW is higher than the specified standard temperature of engine cooling water T1, this indicates that the three-way catalytic converter 11 is still during the course of activation or it has been sufficiently activated, then, the control proceeds to step S211 where the corrective coefficient CFB for air-fuel ratio feedback control is calculated based on a variation between a slice level SL representative of a target air-fuel ratio ($\lambda=1$) and the output Vo of oxygen ($O_2$) sensor 16. On the other hand, if the answer to the decision is "NO," i.e. if the catalytic converter 11 is not yet active, then, at step S212, the corrective coefficient CFB for air-fuel ratio feedback control is fixed or clamped at zero (0) so as to conduct an open loop control of air-fuel ratio. Thereafter, a decision is made at step S213 as to whether the coercive control execution time t1 counted down is still larger than a specific time tA. This time tA is such that the air-fuel ratio deflection amplitude CW1 is continually reduced gradually for the time. If the answer is "YES," then, another decision concerning the coercive control execution time t1 is conducted. That is, at step S214, a decision is made as to whether or not the coercive control execution time t1 has not yet been fully counted down. When the answer is "YES," another decision is made at step S215 as to whether or not the air-fuel ratio deflection amplitude CW1 has not yet become zero. When the air-fuel ratio deflection amplitude CW1 is not zero, it is changed by a decrement of a unit amplitude dCW1 at step S216. When the answer to the decision concerning the coercive control execution time t1 made at step S213 is "NO," this indicates that the coercive control execution time t1 has been counted down to the specific time tA, or after having changed the air-fuel ratio deflection amplitude CW1 by a decrement of the unit amplitude dCW1 at step S216, the oscillation coefficient CV is subsequently calculated by multiplying the air-fuel ratio deflection amplitude CW1, having been changed at step S216, by a constant A at step S217. Then, the coercive control execution time t1 is counted down to by a unit time dt1 at step S218. On the other hand, when a "NO" answer is provided to the decision concerning the coercive control execution time t1 made at step S214 or the decision concerning the air-fuel ratio deflection amplitude CW1 made at step S215 is "NO", the oscillation coefficient CV is set to zero (0) at step S219.

Thereafter, according to an effective pulse width of fuel injection pulse Ti calculated based upon the basic pulse width of fuel injection pulse Tpk, the air-fuel ratio feedback control corrective coefficient CFB, the oscillation coefficient CV, and the corrective coefficient CW, at step S220, the fuel injector 5 is driven to deliver the amount of fuel depending upon the effective fuel injection pulse width Ti at step S222 at an appropriate injection timing judged at step S221.

With the air-fuel control system, an initial oscillation coefficient CV is determined based on the temperature of engine cooling water TW at starting of the engine 1, and the coercive air-fuel ratio control is performed with the initial oscillation coefficient CV before a lapse of the specific time ta. In this instance, the lower the temperature of engine cooling water TW is, i.e. the less the progress of activation of the three-way catalyst is, the larger the initial oscillation coefficient CV becomes and the longer the time for which an air-fuel ratio is changed becomes. Accordingly, the air-fuel ratio control system is favorable to exhaust gas purification with the three-way catalyst over cold starting of an engine. After a lapse of the specific time ta, the oscillation coefficient CV gradually declines with time, so that the convergency of air-fuel ratio toward a target air-fuel ratio is achieved with a high degree.

Because, a significant improvement of exhaust gas purification efficiency is observed with a palladium (Pd) group of catalysts, the air-fuel ratio control system of the present invention is more effective when used in combination with a palladium type catalyst.

It is to be understood that although the present invention has been described in detail with respect to preferred embodiments, various other embodiments and variants may occur to those skilled in the art, which fall within the scope and spirit of the present invention. Such other embodiments and variants are intended to be covered by the following claims.

What is claimed is:

1. An air-fuel ratio control system for an internal combustion engine in which an air-fuel ratio feedback control is executed to converge an air-fuel ratio toward a target air-fuel ratio, which provides a satisfactory exhaust gas purifying efficiency of an exhaust gas purifying device, on the basis of an oxygen concentration in an exhaust gas detected by an oxygen sensor and which coercively deflects the air-fuel ratio so as to make a fuel mixture alternatively richer and leaner during an execution of the air-fuel ratio feedback control, said air-fuel ratio control system comprising:

activation detecting means for detecting a progress of activation of the exhaust gas purifying device; and control means for, when the activation detecting means detects a progress of activation of the exhaust gas purifying device less than a predetermined level, increasing an extent of deflection of the air-fuel ratio and decreasing the extent of deflection of the air-fuel ratio with the progress of activation of the exhaust gas purifying device.

2. An air-fuel ratio control system as defined in claim 1, wherein said activation detecting means includes a temperature sensor for detecting an engine temperature and determines the progress of activation of the exhaust gas purifying device to be less than the predetermined level when said temperature sensor detects an engine temperature lower than a predetermined temperature level.

3. An air-fuel ratio control system as defined in claim 2, wherein said temperature sensor detects an engine coolant temperature as an engine temperature.

4. An air-fuel ratio control system as defined in claim 1, wherein the control means changes the deflection of the air-fuel ratio from a rich side to a lean side and vise versa upon a reversal of an output of the oxygen sensor with respect to a slice level.

5. An air-fuel ratio control system as defined in claim 4, wherein the control means includes a signal generator for generating a signal on a specific frequency according to which the deflection of the air-fuel ratio is changed between the rich side to the lean side.

6. An air-fuel ratio control system as defined in claim 4, wherein an output of the oxygen sensor at the slice level is provided for the target air-fuel ratio.

7. An air-fuel ratio control system for an internal combustion engine in which an air-fuel ratio feedback control is executed to converge an air-fuel ratio toward a target air-fuel ratio, which provides a satisfactory exhaust gas purifying efficiency of an exhaust gas purifying device, on the basis of an oxygen concentration in an exhaust gas detected by an oxygen sensor and which causes a coercive deflection of the air-fuel ratio so as to make a fuel mixture alternatively richer and leaner during an execution of the air-fuel ratio feedback control, said air-fuel ratio control system comprising:

temperature sensor means for detecting a temperature of the engine; and control means for establishing a period of time according to and inversely proportional to the engine temperature detected at a start of the engine and executing the coercive deflection of the air-fuel ratio, before an elapse of the period of time, with a specified extent and, after the elapse of the period of time, with a reduced extent smaller than the specified extent.

8. An air-fuel ratio control system for an internal combustion engine in which an air-fuel ratio feedback control is executed to converge an air-fuel ratio toward a target air-fuel ratio, which provides a satisfactory exhaust gas purifying efficiency of an exhaust gas purifying device, on the basis of an oxygen concentration in an exhaust gas detected by an oxygen sensor and which causes a coercive deflection of the air-fuel ratio so as to make a fuel mixture alternatively richer and leaner during an execution of the air-fuel ratio feedback control, said air-fuel ratio control system comprising:

temperature sensor means for detecting a temperature of the engine; and control means for establishing an initial extent of deflection of the air-fuel ratio according to and inversely proportional to the engine temperature detected at a start of the engine and executing the coercive deflection of the air-fuel ratio with a diminishing extent from the initial extent with time.

9. An air-fuel ratio control system for an internal combustion engine in which an air-fuel ratio is feedback controlled by converging toward a target air-fuel ratio which provides a satisfactory exhaust gas purifying efficiency of an exhaust gas purifying device, on the basis of an oxygen concentration in an exhaust gas, said air-fuel ratio control system comprising:

activation detecting means for detecting a progress of activation of the exhaust gas purifying device; and control means for establishing a differential control value larger before a progress of activation of the exhaust gas purifying device has reached a predetermined level than after it has reached the predetermined level.

10. An air-fuel ratio control system as defined in claim 9, wherein said activation detecting means includes a temperature sensor for detecting an engine temperature and determines the progress of activation of the exhaust gas purifying device to be less than the predetermined level when said temperature sensor detects an engine temperature lower than a predetermined temperature level.

11. An air-fuel ratio control system as defined in claim 10, wherein said temperature sensor detects an engine coolant temperature as an engine temperature.

* * * * *